Dec. 3, 1957  C. H. WERTH  2,814,964
CONTOUR BORING AND TURNING MACHINE
Filed May 4, 1953  2 Sheets-Sheet 1
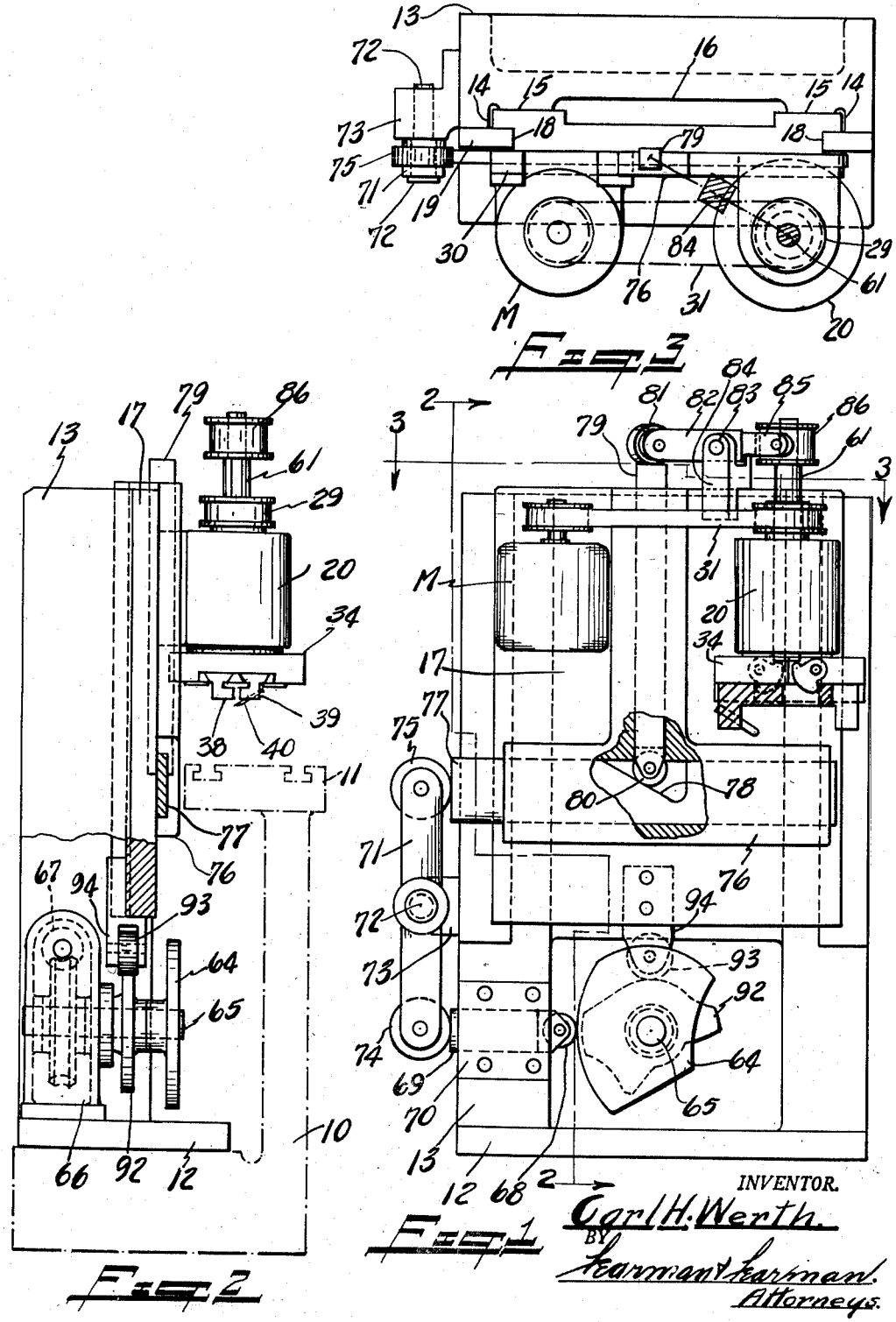
INVENTOR.
Carl H. Werth
BY
Learman & Learman
Attorneys.

Dec. 3, 1957  C. H. WERTH  2,814,964
CONTOUR BORING AND TURNING MACHINE
Filed May 4, 1953  2 Sheets-Sheet 2
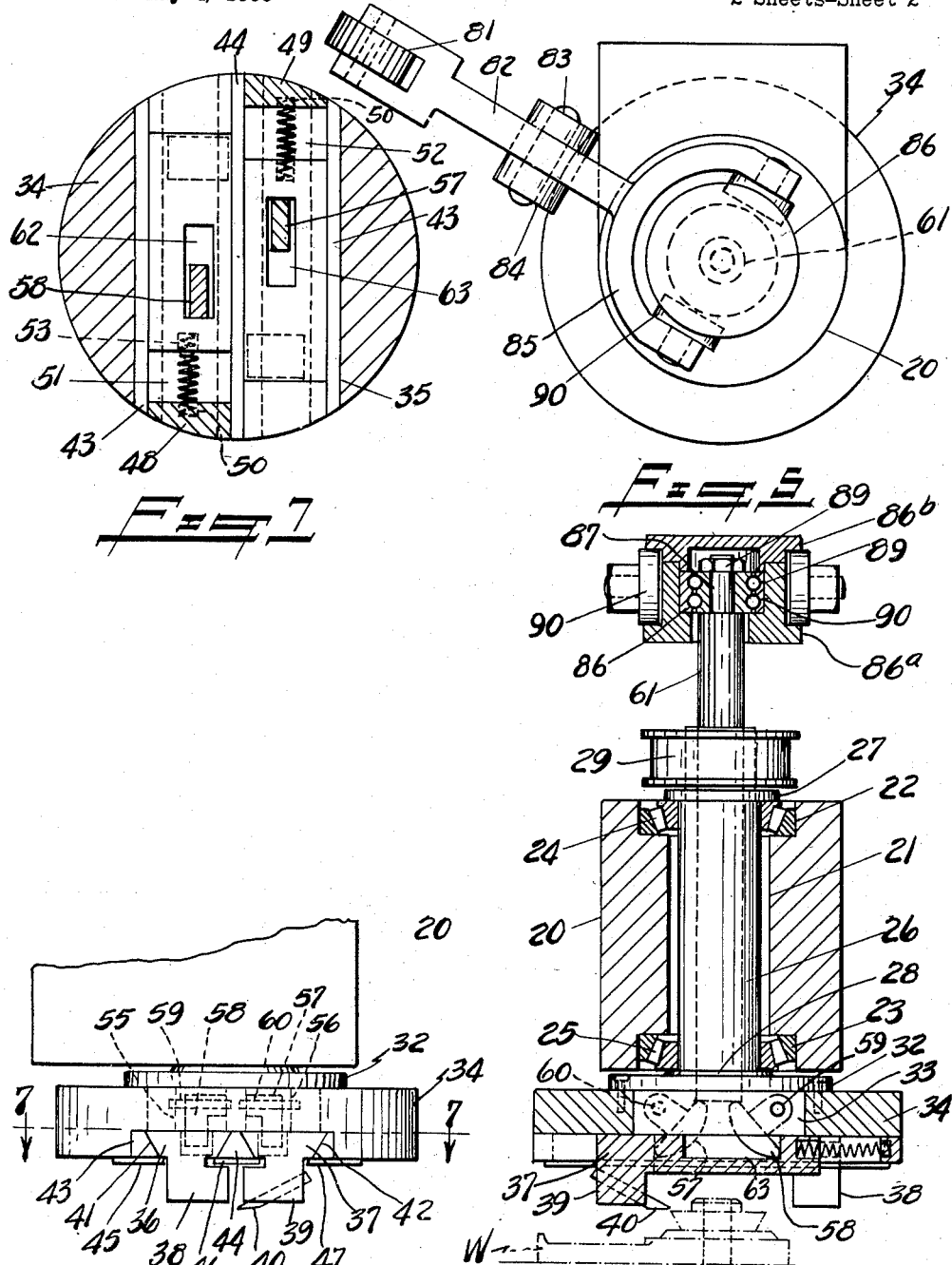
INVENTOR.
Carl H. Werth.
BY
Harmon & Harmon.
Attorneys.

United States Patent Office 2,814,964
Patented Dec. 3, 1957

2,814,964

CONTOUR BORING AND TURNING MACHINE

Carl H. Werth, Saginaw, Mich.

Application May 4, 1953, Serial No. 352,714

5 Claims. (Cl. 82—2)

This invention relates to high production contour boring and turning machines and more particularly to a control mechanism for automatically adjusting the position of the cutting tool during the machining operation.

One of the prime objects of the invention is to design an automatic control mechanism by means of which a stationary workpiece can be turned to profile or contour without interruption of the rotation of the cutting tool.

Another object of the invention is to design an automatic control mechanism for accurately and positively adjusting the turning or boring position of the tool while the tool is cutting, thus materially reducing the down time of the machine usually necessary when adjusting the cutting range of the tool to change the size dimension of the work or compensate for tool wear.

A further object of the invention is to design an automatically controlled machine of the type described wherein the turning or boring range of the tool is adjusted simultaneously with the axial adjustment of the spindle assembly and tool, thereby enabling the machining of intricate contours and profiles on a quantity production basis with a high standard of accuracy.

A further object of the invention is to provide a pair of opposed tool slides in the spindle assembly which are simultaneously adjusted radially to vary the cutting range of the cutting tool or tools, thus balancing the effect of the centrifugal forces acting upon the assembly and assuring a smooth rotation for the spindle and a smooth cut undisturbed by vibration resulting from an unbalanced movement.

Another object of the invention is to design a contour boring and turning machine wherein a pair of cams, through a unique and novel system of slides and levers, automatically vary both the diametral cutting range of the tool and the axial position thereof relative to the work during the machining operation.

A still further object of the invention is to design a contour boring and turning mechanism of the type described which is relatively economical to manufacture and assemble and which permits the automatic cutting of intricate contours or profiles without manual adjustment, thus enabling the low cost machining of large numbers of castings which were formerly very expensive to machine.

With the above and other objects in view, the present invention consists in the combination and arrangement of parts, hereinafter more fully described, illustrated in the accompanying drawings, and more particularly pointed out in the appended claims, it being understood that changes may be made in the size, form, proportion, and minor details of construction, without departing from the spirit, or sacrificing any of the advantages of the invention.

In the drawings:

Fig. 1 is a front elevational view of the machine, parts being broken away to more clearly show the construction of some of the parts.

Fig. 2 is a part sectional, edge elevational view taken on the line 2—2 of Fig. 1, omitting the motor and belt for driving the spindle, the broken lines indicating a standard machine frame with a worktable thereon.

Fig. 3 is a part sectional, top plan view taken on the line 3—3 of Fig. 2.

Fig. 4 is an enlarged, sectional, elevational view through the spindle assembly only, the broken lines indicating a workpiece clamped in position adjacent a cutting tool.

Fig. 5 is a top plan view of the spindle assembly with an actuating rock arm for adjusting the cutting range of the tool.

Fig. 6 is an enlarged, fragmentary, and elevational view of the spindle head.

Fig. 7 is a sectional plan view taken on the line 7—7 of Fig. 6.

Referring now to the accompanying drawings in which I have shown the preferred embodiment of my invention and more particularly to Fig. 2 thereof, the broken lines indicate a standard machine frame which can be built up in various sizes and shapes, the numeral 10 indicating the bed of the frame and the numeral 11 the worktable supported thereon. Obviously, the worktable could be any of those commonly employed today and could be indexible or non-indexible as desired. Mounted on the bed 10 of this frame is the base or platform 12 of the machine unit which forms the subject matter of the instant invention, an upright frame member 13 being supported on the rear of the base platform 12 as shown in Figs. 2 and 3. The front wall of the member 13 is recessed at both ends as at 14, and flat guide surfaces 15 are machined in the front wall of the member 13, the wall thence being centrally recessed as at 16. A slide frame 17 moves vertically on the front wall of the member 13, and it will be noted that the slide frame is shouldered as at 18 and that plates 19 secured to the frame 13, retain the slide frame in position.

A spindle housing 20 is rigidly mounted on the slide 17 as shown, and through reference to Fig. 4, it will be observed that the interior bore 21 of the housing 20 is shouldered as at 22 and 23 to accommodate taper roller bearings 24 and 25 which support the bored spindle 26. Collars 27 and 28 formed on the spindle 26 prevent vertical movement thereof relative to the housing 20, and a pulley 29 on the spindle is driven by a motor M with base legs 30 through the medium of a belt 31. The lower portion of the spindle 26 is formed with a flange 32, and terminates in an enlarged end section 33. A head 34 is bolted to the flange 32 as illustrated in Fig. 1. As shown in Figs. 6 and 7, the head 34 is centrally bored as at 35 to accommodate a pair of oppositely sliding cross-slides 36 and 37 on which are mounted the depending tool holders 38 and 39 in which cutting tools 40 may be mounted.

In Figs. 4 and 6, a tool 40 is shown mounted only in the tool holder 39, but it is clear that a tool could be mounted in the holder 38 as well, and that the tools could be set in their holders so that one would take a finishing cut while the other was taking a roughing cut. The slides 36 and 37 are provided with outwardly angled surfaces 41 and 42 respectively, for sliding engagement with the ways or slide blocks 43 provided at the sides of the opening 35 and a V-shaped central way or block 44. Retaining plates 45, 46 and 47, bolted to the head 34, secure these ways or blocks in position. Blocks 48 and 49 are formed with recesses 50 to accommodate coil springs 51 and 52 secured to the head 34 as shown in Fig. 7, the cross slides 36 and 37 also having spring-accommodating recesses 53 and 54 and being biased in opposite directions for a purpose to be presently described.

Formed within the enlarged end 33 of the spindle 26 is a pair of recesses 55 and 56 in which are pivotally mounted the cross slide actuating bell crank levers 57 and 58 on the pins 59 and 60. These levers are operated by an adjusting rod or shaft 61 which is adjustable vertically in the spindle in a manner to be presently described. The bell crank levers 57 and 58 project into slots 62 and 63 in the cross slides to move the cross slides in a direction to compress the follower springs 51 and 52 which maintain the slides in engagement with the levers 57 and 58 at all times. The provision of a pair of oppositely movable cross slides has far greater purpose than the addition of a second tool holder which, of course, it also accomplishes. If a single cross slide is moved inwardly or outwardly during the cut, unbalanced centrifugal forces are set up which disturb the smooth rotation of the head, and cause vibration which affects the smoothness of the cut. In the instant invention, the pair of slides are simultaneously moved an equal distance, in opposite directions, and the equal centrifugal forces acting on the sides are therefore opposed and offset each other.

The movement of the shaft 61 is controlled by a cam 64 mounted on a cam shaft 65 (see Figs. 1 and 2) which is driven through a conventional speed reducer 66 by a motor (not shown), connected to the drive pulley 67. The cam 64 is in engagement with a roller 68 provided on one end of a horizontally disposed slide 69 which is slidably mounted in a recess in the frame member 13, and a plate 70 forms a closure for the open side of the recess as shown. A rock arm 71 is pivotally supported as at 72 by a bracket 73 mounted on the side of the frame member 13, and rollers 74 and 75 are journaled in the forked ends of the rock arm 71.

A T-shaped slide housing 76 is provided on the slide frame 17, and a horizontal bar slide 77 is provided in the lower end thereof in engagement with the upper roller 75 on the rock arm 71. A portion of the upper wall and side wall of the slide 77 is cut away as shown in Fig. 1 to form an angled cam surface 78 therein, and a vertically disposed slide 79 is mounted in the leg of the T-shaped housing 76 with a roller 80 on the lower end thereof for engagement with the cam surface 78. The upper end of the slide 79 engages a roller 81 journaled in the forked end of a rock arm 82 which extends angularly to the upper end of the shaft 61. The arm 82 is pivotally supported as at 83 interjacent its ends on an angularly disposed bracket 84, and the opposite end of the arm 82 is formed with an enlarged clevis 85 which embraces a collar 86, said collar comprising sections 86a and 86b secured together in any desired manner. The upper end of shaft 61 is turned as at 87, and an anti-friction bearing 88 is mounted thereon with a nut 89 threaded on the upper end of the shaft. The collar 86 is hollow and internally shouldered to accommodate the bearing 88 and lugs 90 are journaled on the free ends of the clevis and ride in the grooved outer section 91 of the collar 86, permitting free rotation of the shaft.

The above mechanism, of course, adjusts the shaft 61 vertically to move the cross slides 36 and 37 horizontally and thereby adjust the cutting range of the tool. It will also be expedient to provide means for automatically adjusting the entire spindle assembly vertically in high production profiling operations. A cam 92 is therefore provided on the shaft 65 in engagement with a roller 93 on a depending arm 94 bolted to the slide frame 17, and it will be apparent that the entire spindle assembly moves vertically with the slide frame 17 in response to the throw of the cam 92.

In operation, the workpiece W is clamped to the stationary worktable and the cam mechanism and tool are adjusted to proper position to begin the cut. Thereafter, the operation of the machine is completely automatic, the vertical and horizontal position of the tool or tools depending on the throw of the cams 64 and 92 respectively. The slide 69, in response to the cam 64, pivots the rock arm 71 which actuates the slide 77, thus changing the position of the sloped cam surface 78 to raise or lower the slide 79. The latter slide 79 pivots the rock arm 82 to adjust the position of the shaft 61 which actuates the bell crank levers 57 and 58 and the cross slides 36 and 37.

In conjunction with this horizontal adjustment of the slides and tool, the cam 92 as noted, moves the slide frame 17 vertically, and thereby the spindle assembly which is rigidly connected thereto, to make possible very intricate profiling cuts. Since a pair of oppositely moving cross slides are employed, the centrifugal forces which influence their radial movement are balanced and there is no interference with the smooth rotation of the spindle.

It will be obvious that I have designed a high production, automatic boring and turning machine which is capable of machining large numbers of castings of intricate shape in a relatively short time on a production basis.

What I claim is:

1. In a boring and turning machine for profiling a stationary workpiece, a main frame, a slide frame vertically movable thereon, a spindle housing on said slide frame, a hollow spindle rotatable in said housing, motor means on said slide frame for driving said spindle, a head on said spindle, a tool slide, including a tool holder and tool movable radially in said head to adjust the diametral cutting range of the tool, a shaft extending through said spindle to operate said tool slide, a horizontal slide having an angled cam surface formed therein adjustably disposed in said slide frame, a rock arm pivoted interjacent its ends having one end operatively connected to said shaft, a vertical slide in engagement with the opposite end of said rock arm riding on said cam surface, cam operated means on said main frame for actuating said horizontal slide to operate said shaft and cam means moving said slide frame simultaneously to adjust the tool axially and radially with relation to the work-piece during rotation of the spindle and tool.

2. In a boring and turning machine for profiling a stationary workpiece, an upright main frame, a vertically movable slide frame mounted thereon, a spindle housing on said slide frame, a vertically disposed hollow spindle rotatable in said housing, means on said slide frame for driving said spindle, an enlarged head on said spindle below said housing, a pair of parallelly disposed cross slides movable horizontally in said head, at least one of said slides having a tool holder and tool, the diametral cutting range of which is adjusted by movement of said slide, a substantially T-shaped lever pivotally mounted at its base end in each side of said spindle, said cross slides having openings into which one end of the head of each lever extends for operating said slides, a shaft extending through said spindle intermediate said levers to engage the opposite free ends of the heads of said levers and swing them to operate said slides, follower springs in said head for urging said cross slides into engagement with said levers, a stationary collar on the upper end of said shaft, a horizontal slide having an angled surface formed therein adjustably mounted in said slide frame, a substantially horizontally disposed rock arm pivoted interjacent its ends having one end thereof connected to said collar, a vertical slide riding on said cam surface in engagement with the opposite end of said rock arm, a slide and rock arm system on said main frame for actuating said horizontal slide, and a cam shaft and a cam thereon for operating said slide and rock arm system.

3. The combination defined in claim 2 in which a second cam on said cam shaft actuates said slide frame vertically in conjunction with said first cam to simultaneously adjust the radial and axial positions of the tool assembly relative to the workpiece.

4. A machine tool comprising a bed having ways, a main slide mounted on said bed and slidable in said ways, a sub slide mounted on said main slide for movement relative thereto, cam shaft means mounted on said bed, a main cam on said cam shaft means, means cooperating with said main cam for sliding said main slide, a sub cam mounted on said cam shaft means for creating said movement of said sub slide, and means transmitting the action of the sub cam to the sub slide comprising mechanism including an actuating member mounted on said bed having a part movable transversely of the path of movement of said main slide, said actuating member being actuated by said sub cam, means mounted on said main slide having a part movable transversely of the path of movement of said main slide and in operating engagement with said part of said actuating member, said last means part having an engagement surface parallel to the movement of said main slide and of an extent corresponding to the movement of said main slide whereby the movement of the sub slide imparted by the sub cam bears a direct relation to the configuration of the sub cam irrespective of the movement of the main slide.

5. The machine tool set forth in claim 4 including a rotatable spindle carried by said main slide, a head for said spindle, a tool holder movable transversely to the axis of said spindle on said head during rotation of said spindle, and means transmitting the movement of said sub slide to said tool holder for imparting movement to the latter in response to movement of said sub cam.

References Cited in the file of this patent

UNITED STATES PATENTS

| | | |
|---|---|---|
| 1,109,387 | Banta | Sept. 1, 1914 |
| 2,127,792 | Swift | Aug. 23, 1938 |
| 2,395,121 | Hodges | Feb. 19, 1946 |
| 2,486,977 | Peters | Nov. 1, 1949 |
| 2,593,124 | Eaton | Apr. 15, 1952 |
| 2,641,146 | Dilts | June 9, 1953 |
| 2,651,832 | Menard | Sept. 15, 1953 |

FOREIGN PATENTS

| | | |
|---|---|---|
| 264,680 | Switzerland | Feb. 1, 1950 |